G. W. SEAMAN.
BEARING.
APPLICATION FILED JAN. 13, 1911.
1,050,177.
Patented Jan. 14, 1913.
2 SHEETS—SHEET 1.
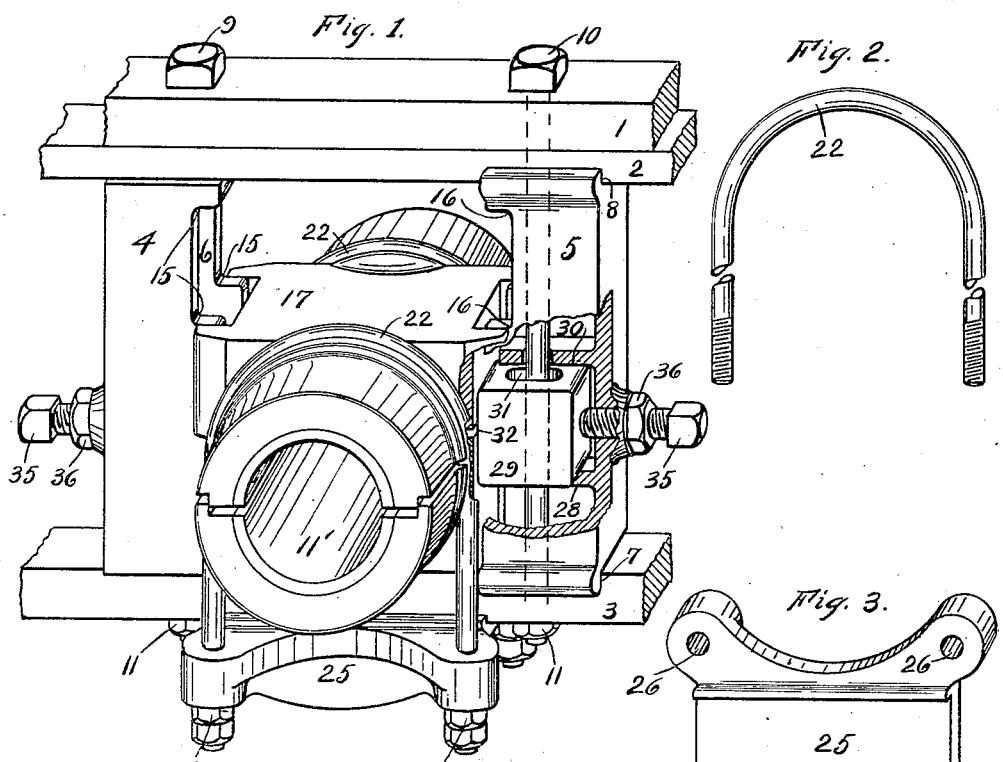
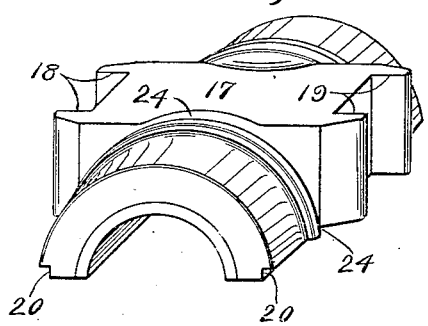
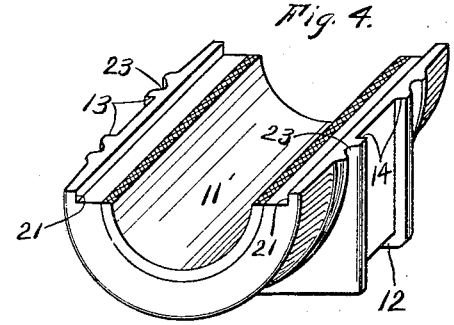

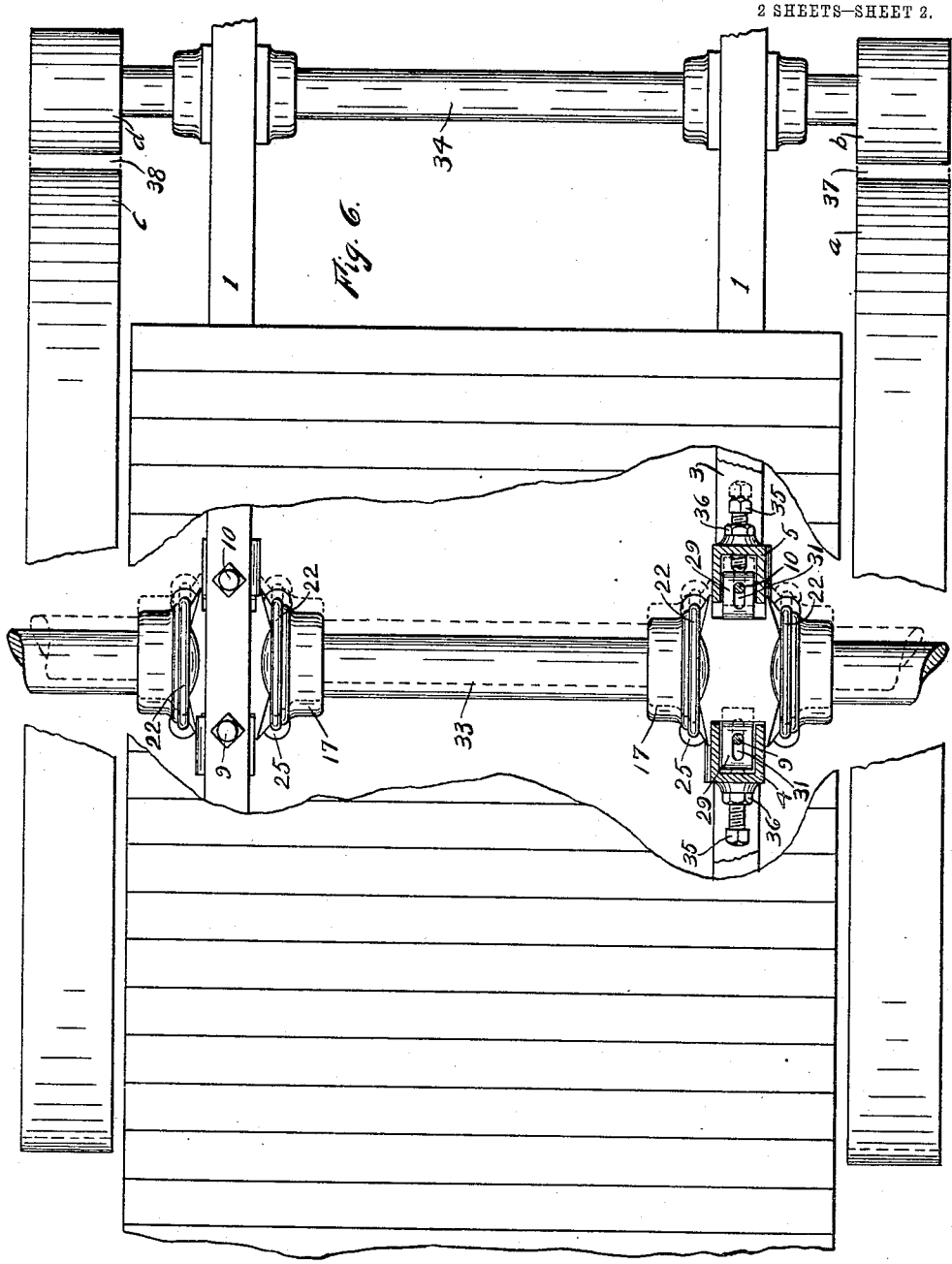

UNITED STATES PATENT OFFICE.

GEORGE W. SEAMAN, OF MANSFIELD, OHIO, ASSIGNOR TO THE AULTMAN & TAYLOR MACHINERY COMPANY, OF MANSFIELD, OHIO, A CORPORATION OF OHIO.

BEARING.

1,050,177. Specification of Letters Patent. Patented Jan. 14, 1913.

Application filed January 13, 1911. Serial No. 602,428.

*To all whom it may concern:*

Be it known that I, GEORGE W. SEAMAN, citizen of the United States of America, residing at Mansfield, in the county of Richland and State of Ohio, have invented certain new and useful Improvements in Bearings, of which the following is a specification.

My invention relates to bearings or journal boxes and is especially adapted to be used for alining shafts.

The objects of my invention are to provide bearings for shafts that can be adjusted in a horizontal plane to provide means of properly alining the mesh of gears or pulleys for power transmission with each other; to provide means of removing the cap and journal box without difficulty and conveniently; to provide a compact and efficient bearing with means of rigidly securing the journal box and bearing to the frame-work of a "tractor" or the like. I attain these and other objects by the mechanism illustrated in the accompanying drawings in which:—

Figure 1 is a side view in perspective of an assembled bearing, housings with parts broken away to show more clearly the adjusting block and means of adjusting the same. Fig. 2 is a detail plan view of a yoke or strap having its ends threaded. Fig. 3 is a side elevation showing the bottom of a clamping block used in conection with the yoke. Fig. 4 is a perspective view of the journal box. Fig. 5 is a perspective view of the journal cap. Fig. 6 is a plan view of part of the frame-work of a "tractor" showing a shaft mounted in the bearings, one of the bearings being shown assembled and the other partly in section. The adjustable shaft is shown in full and dotted lines, another shaft being shown substantially parallel with which it can be alined if necessary. Conventional forms of gears are shown mounted on both shafts.

Referring to the drawings, reference numerals 1, 2 and 3 indicate parts of the frame-work of a "tractor". Hollow housings 4 and 5 are provided having one side open as indicated by reference numeral 6 in Fig. 1. The housings are provided on both their extremities with grooved portions forming shoulders 7 and 8 which fit and engage with the frame bars 2 and 3 and prevent the housings from moving in a lateral direction. Through-going bolts 9 and 10 securely and rigidly hold the housings in place upon the frame-bars by the nuts 11.

A journal box 11' is provided having a grooved shouldered portion 12 formed on the bottom to engage the frame-bar 3 which prevents any lateral movement of the box. Flanged portions 13 and 14 are formed on each side of the box and are adapted to provide a margin for forming grooves hereinafter described. Recesses 15 and 16 are provided adjacent to the upper extremities of the open sides of the housings 4 and 5 of such a length and width as to permit a cap 17 to be inserted therein.

The journal cap 17 is provided with shouldered portions 18 and 19 which are adapted to be inserted in the recessed portions 15 and 16 and dropped down until the grooved shouldered portions 18 and 19 extend on each side of the housings, and slidably engage the open sides thereof. The faces of the journal box and cap are also provided with shouldered portions 20—20 and 21—21 which engage with each other and prevents lateral movement of the cap with reference to the journal box.

In order to securely retain the journal box and cap in their normal positions, I provide yokes 22 which are adapted to seat in the annular grooves 23 and 24 formed in the cap and partially on the journal box leaving the ends of the yokes extending downwardly below the frame-bar 3. A clamping block 25 is provided with a shouldered grooved portion adapted to engage with the frame-bar 3 and is also provided with apertures 26 which engage the free ends of the yokes. The threaded ends of the yokes pass through the clamping block and are adapted to engage with the lock nuts 27—27 and when tightened securely hold and retain the journal box and cap in place upon the frame-bar 3. If it is desired to remove the cap 17, the nuts 27 are removed and the yoke withdrawn from the clamping block, the cap can then be easily removed by lifting it upward until it reaches the recessed or grooved portions 15 and 16 at which point it can be withdrawn from the housings.

The journal box 11' can be removed by withdrawing it from the side as it does not engage with the housings. Ledges 28 are provided in the housings extending inwardly toward the open sides to provide supports for the adjustable blocks 29 for the purpose of guiding them and forming a pocket therefor. An elongated slot 31 is provided in the adjusting blocks 29 to provide for the lateral adjustment of the journal box and cap. The inner faces 32 of the adjusting blocks normally contact with the bottom of the grooved portions 13, 14, 18 and 19 of the cap and journal box and when it is desired to adjust the journal box and cap to aline the shaft 33, the adjusting block is forced in contact with the cap and journal box adjusting the shaft laterally either forwardly or rearwardly as described to aline said shaft with a similar shaft 34.

The adjusting of the journal box and cap carrying the shaft 33 is accomplished through the medium of the adjusting screws 35 which contact with the cap and journal boxes held in their adjusted position by the lock-nuts 36. As both of the housings are the same and are provided with exactly the same adjusting means, I do not deem it necessary to describe the adjusting means provided in each of the housings 4 and 5 any more than to say that the adjusting means in one housing is used to adjust the shaft laterally or in a horizontal plane in one direction and the adjusting means in the opposite housing is used to adjust the shaft in the opposite direction.

In Fig. 6 gears $a$, $b$, $c$ and $d$ are shown in a conventional form with spaces 37 and 38 to show the principle upon which my invention operates. The dotted lines in Fig. 6 shows how the shaft 33 can be adjusted laterally or in a horizontal plane to equalize the mesh of the gears or aline pulleys when the shaft upon which they are mounted are out of alinement with each other.

What I claim is:—

1. The combination of a journal box comprising a cap and box provided with grooved shouldered portions; of a shaft journaled in said box and cap, a frame provided with housings having recessed portions to permit the removal of the cap, yokes engaging said cap, a clamping block to engage said yokes, and means engaging said yokes to clamp the cap and box to the frame.

2. The combination of a journal box and frame provided with housings, a cap and box provided with grooved shouldered portions; of a shaft journaled in said box and cap, said housings being provided with recesses to permit the removal of the cap, yokes engaging said cap, a clamping block to engage said yokes, means on the yokes to hold the cap and box on the frame, adjustable blocks having elongated apertures supported by the housings of said frame and normally contacting with the cap and box, and means to adjust said block to move the shaft in a lateral direction for alining purposes.

3. The combination of a journal box comprising a cap and box provided with grooved shouldered portions; of a shaft journaled in said box and cap, a frame provided with housings which are adapted to engage with said grooved shouldered portions of the cap and box, yokes to engage the cap and hold said journal box at a predetermined point on the frame, a clamping block to engage said yokes, and means to remove the cap and box without disturbing the shaft.

4. The combination with a frame provided with housings having ledges, a journal box comprising a cap and box having grooved portions, means to mount said journal box on the frame, adjustable slotted blocks carried by the housings, means to retain said adjustable slotted blocks on the ledges of the housings of the frame, and means to impart lateral movement to the blocks which imparts a similar movement to the cap and box.

In testimony whereof I affix my signature in presence of two witnesses.

GEORGE W. SEAMAN.

Witnesses:
 ELIZABETH KIPP,
 JOHN H. COSS.

---

Copies of this patent may be obtained for five cents each, by addressing the "Commissioner of Patents, Washington, D. C."